United States Patent [19]

Camps et al.

[11] Patent Number: 4,508,639

[45] Date of Patent: Apr. 2, 1985

[54] POLYMERS CONTAINING HETEROCYCLES AND AROMATIC NUCLEI, AND CONDUCTIVE ORGANIC MATERIALS MADE FROM SUCH POLYMERS

[75] Inventors: Marcel Camps, St. Etienne; Alain Douillard, Rives-de-Gier; Jean-Claude Dubois; Maryse Gazard, both of Paris; Jean-Pierre Monthéard; Thierry Pascal, both of St. Etienne; Gérard Seytre, Tassin-la-Demi-Lune, all of France

[73] Assignee: Thomson-CSF, Paris, France

[21] Appl. No.: 497,234

[22] Filed: May 23, 1983

[30] Foreign Application Priority Data

May 25, 1982 [FR] France ................................ 82 09049

[51] Int. Cl.³ .......................... C08G 75/00; C08G 83/00
[52] U.S. Cl. ...................................... 252/500; 252/510;
252/518; 528/377; 528/378; 528/379; 528/380;
528/403; 528/405
[58] Field of Search ...................... 252/500, 510, 518;
528/377–380, 403, 405

[56] References Cited

FOREIGN PATENT DOCUMENTS 0037924  4/1980  European Pat. Off. ............ 252/500
1000679  of 0000  United Kingdom ................ 528/377

OTHER PUBLICATIONS

JPS, vol. 18, No. 1, Jan. 1980, John Wiley & Sons Inc., NY (U.S.), *Preparation of Thermostable and Electric-Conducting Poly(2,5-Thienylene)*, pp. 9–12.
JPS–Polymer Letters, vol. 19, No. 7, Jul. 1981, J. Wiley & Sons Inc., New York (U.S.), "Polymerization of Aromatic Nuclei. XXVIII. Synthesis and Properties of Poly(2,5-Selenienylene)", pp. 347–353.

*Primary Examiner*—Lester L. Lee
*Attorney, Agent, or Firm*—Oblon, Fisher, Spivak, McClelland & Maier

[57] ABSTRACT

The polymer material is made from a first monomer and from a second monomer. The first monomer Ar includes at least one aromatic nucleus and the second monomer is a five links conjugated heterocyclic ring. The polymer material has the following general chemical formula:

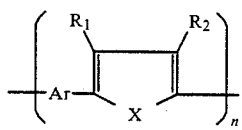

in which: X represents the group constituted by sulphur and selenium; $R_1$ and $R_2$ are chosen from the group constituted by hydrogen, and by the alkyl, alkoxyl, and hydroxyl groups; and n is the degree of polymerization. Such materials can be made conductive by adding a doping agent, and they can then be used for manufacturing electrodes, junctions, Schottky barriers, etc.

6 Claims, No Drawings

POLYMERS CONTAINING HETEROCYCLES AND AROMATIC NUCLEI, AND CONDUCTIVE ORGANIC MATERIALS MADE FROM SUCH POLYMERS

The present invention relates to polymers which are rendered conductive by incorporating a doping agent. Such polymers contain heterocyclic rings and aromatic nuclei.

BACKGROUND OF THE INVENTION

A large number of conductive polymers have already been discovered. They are constituted by a base polymer including conjugated double bonds and a doping agent which serves to provide a charge transfer complex. The oldest and most widely studied polymer is polyacetylene $(CH)_n$ which has the advantage of being obtainable in the form of a thin film, but which has the disadvantage of being unstable in contact with air. High conductivities of up to $10^3 \Omega^{-1} \cdot cm^{-1}$ can be obtained by doping it with electron acceptor compounds such as the halogens (and in particular iodine), sulphuric acid, or arsenic pentafluoride, or else with electron donor compounds such as the alkali metals. However, when doped with such compounds, the polymer is generally not stable over time, and this has lead the Applicant to search for new doping agents which would remedy said drawback: transition metal halogenides have already constituted the subject matter of French patent application No. 81 13157 filed on July 3, 1981. Unfortunately, such doping does not eliminate polyacetylene's high reactivity with oxygen.

Preferred embodiments of the present invention provide novel conductive materials comprising a base polymer and an electron donor or acceptor, said polymer being synthesised by polycondensation of two monomers, one of which is constituted by aromatic nuclei and the other of which is a five links conjugated heterocyclic ring. This structure ensures that the polymer is stable over time and at high temperatures, and is only slightly reactive with oxygen.

SUMMARY OF THE INVENTION

The present invention provides a polymer material made from a first monomer and from a second monomer, wherein said first monomer includes at least one aromatic nucleus and said second monomer is a five membered conjugated heterocyclic ring, said polymer material having the following general chemical formula:

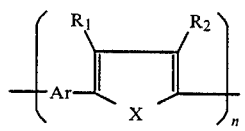

in which:
Ar represents said first monomer, which is chosen from the group constituted by p-phenylene, m-phenylene, biphenylene, anthracene, fluorene, phenanthrene, and substituted derivatives of said compounds;

represents said second monomer;
X represents the group constituted by sulphur and selenium;
$R_1$ and $R_2$ are chosen from the group constituted by hydrogen, and by the alkyl, alkoxyl, and hydroxyl groups; and
n is the degree of polymerisation.

There exist conductive polymers which are temperature stable and which do not react with oxygen in the air. These polymers are made from monomers containing aromatic nuclei. Examples include: poly-p-phenylene; phenylene polysulphide; and phenylene polyoxide.

Polythiophene is the only conventionally synthesisable polymer to have been described which contains heterocyclic rings. It is rendered conductive by doping with iodine, which can result in a $10^9$ fold increase in conductivity over the undoped polymer. Conductive heterocyclic polymers have been obtained by electrochemically polymerising monomers using an electrolyte based on a compound having an anion which acts as the doping agent. Examples of such polymers include: polypyrrole and polythiophene.

Organic conductive materials in accordance with the invention are based on a polymer having the general formula:

in which:
Ar is an aromatic radical chosen from the group constituted by p-phenylene, m-phenylene, biphenylene, anthracene, fluorene, phenanthrene, and substituted derivatives of said compounds;
X represents sulphur or selenium;
$R_1$ and $R_2$ are either hydrogen or else alkyle, alkoxyl, or hydroxyl groups; and
the factor n is the degree of polymerisation.

The polymers most representative of the invention include: poly(p-phenylene co 2,5-thienylene) having the formula:

poly(4,4'-biphenylene co 2,5-thienylene) having the formula:

poly(p-phenylene co 2,5-selenophene) having the formula:

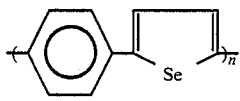

poly(4,4'-biphenylene co 2,5-selenophene) having the formula:

The method of synthesis used to obtain these polymers is derived from the method described by Yamanoto (both in Chemical Letters 353 (1977) and in Journal of Polymer Science, Polymer Letters edition 17, 181 (1979)). The method is used to prepare homopolymers of a monomer A in three stages:
(1) prepare a bihalogenated derivative of the monomer A, eg. the bromided derivative:

(2) prepare a monomagnesiun compound:

Br—A—Br+Mg→Br—A—MgBr; and (3) perform coupling in the presence of a catalyser (a transition metal complex: Ni, Cr, Pd, Co, Fe, etc):

xBr—A—MgBr→Br—(—A—)$_x$—
—MgBr+(x−1)MgBr$_2$.

Method

Copolymers in accordance with the invention are prepared in three stages:
(1) prepare two symmetrical bihalogenated derivatives, eg: Br—Ar—Br and

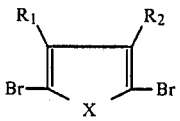

(2) transform one of these derivatives into a bimagnesiun derivative (or Grignard reagent), eg:

Br—Ar—Br+2Mg→BrMg—Ar—MgBr (3) couple the bimagnesiun derivative and the nontransformed bihalogenated derivative in the presence of a transition metal complex acting as a catalyst:

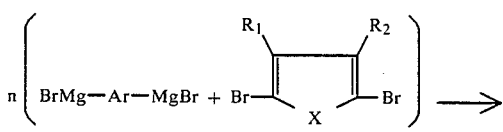

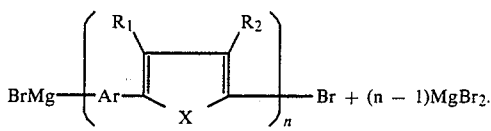

The copolymer is obtained in the form of a powder which is insoluble in organic solvents and which is stable at temperatures up to 400° C. Since the copolymer is insoluble, the degree of polymerisation n cannot be determined. It may be doped using conventional doping methods using electron donors and acceptors such as alkali metals, eg. lithium, halogens, arsenic pentafluoride AsF$_5$, antimony pentafluoride SbF$_5$, or an ammonium compound. The conductivity of the doped polymer increases substantially and depends on the nature and on the concentration of the doping agent.

EXAMPLES

There follow two specific examples of the preparation of organic materials in accordance with the invention.

EXAMPLE 1

To obtain a poly(p-phenylene co 2,5-thienylene) conductor:
(1) prepare two symmetrical bihalogenated derivatives. In this case they are p-dibromophenyl and dibromothiophene, respectively:

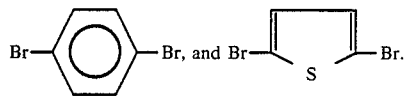

(2) transform the p-dibromophenyl into a bimagnesiun derivative.

Prepare two solutions: a solution A containing 11.8 grams (g) of p-dibromophenyl dissolved in 50 milliliters (ml) of freshly distilled tetrahydrofuran, and a solution B containing 2.45 g of magnesium dispersed in 10 ml of freshly distilled tetrahydrofuran. Pour solution A slowly into solution B into which a flake of iodine has been added to catalyse the reaction to form the Grignard reagent. The reaction mixture is stirred and then refluxed for 48 hours until the magnesium has completely disappeared.

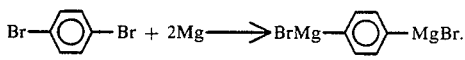

(3) couple the bimagnesian derivative and the non-transformed bihalogenated derivative.

Perform the reaction in the presence of 100 mg of dichloro(1,3-bi(diphelyphosphino)propane-nickel) which acts as a catalyst. Add 12.1 g of dibromothiophene to the solution containing the organomagnesiun derivative obtained at stage (2). Reflux the reaction mixture for two hours. Then pour it into a solution containing 400 ml of methanol, 100 ml of water, and 5 ml of hydrochloric acid. Recover a precipitate by filtering and wash the precipitate in methanol and then dry it in an oven. Use a Soxhlet extractor for three hours with tetrahydrofuran to extract the soluble fractions of the precipitate. The remaining precipitate comprises 6.77 g of a brick red polymer which is insoluble in organic solvents and which is stable up to 400° C. Its formula is:

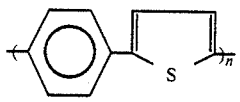

To obtain a conductive pellet, sinter the polymer powder under a pressure of 4000 kgf/cm$^2$ in a mold to produce a pellet which is 13 mm in diameter and about 500 microns thick. Its resistivity at ambient temperature is about $10^{12}\Omega\cdot$cm. Prepare a saturated solution of iodine in hexane. Soak the pellet in the solution for 24 hours while maintaining argon stirring. Rinse the pellet in hexane and then dry it under a vacuum for two hours. Its weight will have increased by 15% by virtue of the iodine incorporated as doping agent. The conductivity of the resulting product is about $10^7$ times greater than the conductivity of the original copolymer, ie. the resistivity is about $10^5\Omega\cdot$cm.

EXAMPLE 2

To obtain a poly(4,4'-biphenylene co 2,5-thienylene) conductor:

(1) prepare two symmetrical bihalogenated derivatives. In this case they are dibromobiphenyl and dibromothiophene, respectively:

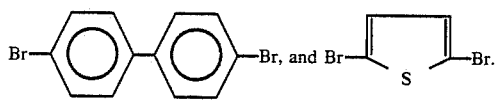

(2) transform the dibromobiphenyl into a bimagnesian derivative.

Use the same method of synthesis as in Example 1, except that solution A contains 15.6 g of dibromobiphenyl.

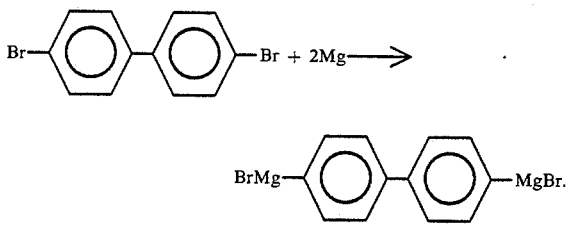

(3) couple the bimagnesian derivatie and the non-transformed bihalogenated derivative.

Once the organomagnesiun derivative has been formed, add 12.1 g of dibromothiophene and 100 g of the nickel complex catalyst mentioned in Example 1 to the solution containing the organomagnesiun derivative. Perform the same steps as in Example 1 to obtain 8.92 g of a brick red polymer which is insoluble in organic solvents and which is stable up to 400° C. Its formula is:

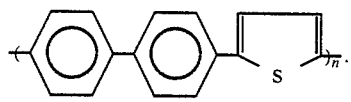

A conductive pellet can then be obtained by sintering. Take a portion of the powder obtained to produce a pellet which is 13 mm in diameter and 300 microns thick, for example. Its resistivity at ambient temperature is about $3\cdot10^{14}\Omega\cdot$cm. Soak the pellet in a saturated solution of iodine in hexane for 24 hours. Rinse the pellet in hexane and then dry it under a vacuum for two hours. After drying, its weight will have increased by 10% and its conductivity will be about $10^7$ times greater than the conductivity of the original copolymer, ie. the resistivity is about $3\cdot10^7\Omega\cdot$cm.

Organic conductor materials in accordance with the invention have electrical properties which enable them to be used as electrodes, eg. in the manufacture of storage batteries. They can also be used in the manufacture of capacitors. When such materials are lightly doped they have p or n type semiconductor properties depending on the nature of the doping agent. They can thus be used to make junctions, Schottky barriers, or components for solar cells. They may also be used in anti-static deposits in various types of application.

What is claimed is:

1. A polymer material made from two different monomer units, wherein said first monomer unit includes at least one aromatic nucleus and said second monomer unit is a five membered conjugated heterocyclic ring, said polymer material having the following formula:

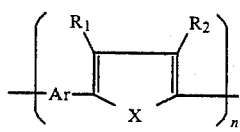

in which:

Ar represents said first monomer unit, which is chosen from the group consisting of p-phenylene, m-phenylene, biphenylene, anthracene, fluorene and phenanthrene, and wherein

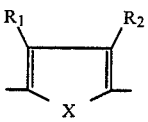

represents said second monomer unit;

wherein X represents the group consisting of sulfur and selenium;

$R_1$ and $R_2$ are chosen from the group consisting of hydrogen, and alkyl, alkoxyl, and hydroxyl groups; and n is the degree of polymerisation.

2. The polymer material according to claim 1, wherein said second monomer is thiophene.

3. The polymer material according to claim 1, wherein said second monomer is selenophene.

4. The polymer material according to claim 1, wherein said material is made electrically conductive by the incorporation therewith of an electron donor or acceptor doping agent.

5. The polymer material according to claim 4, wherein said doping agent is an electron donor chosen from the group constituted by the alkali metals, lithium, and ammonium compounds.

6. The polymer material according to claim 4, wherein said doping agent is an electron acceptor chosen from the group constituted by the halogens, arsenic pentafluoride AsF$_5$, and antimony pentafluoride SbF$_5$.

* * * * *